Figure 1:
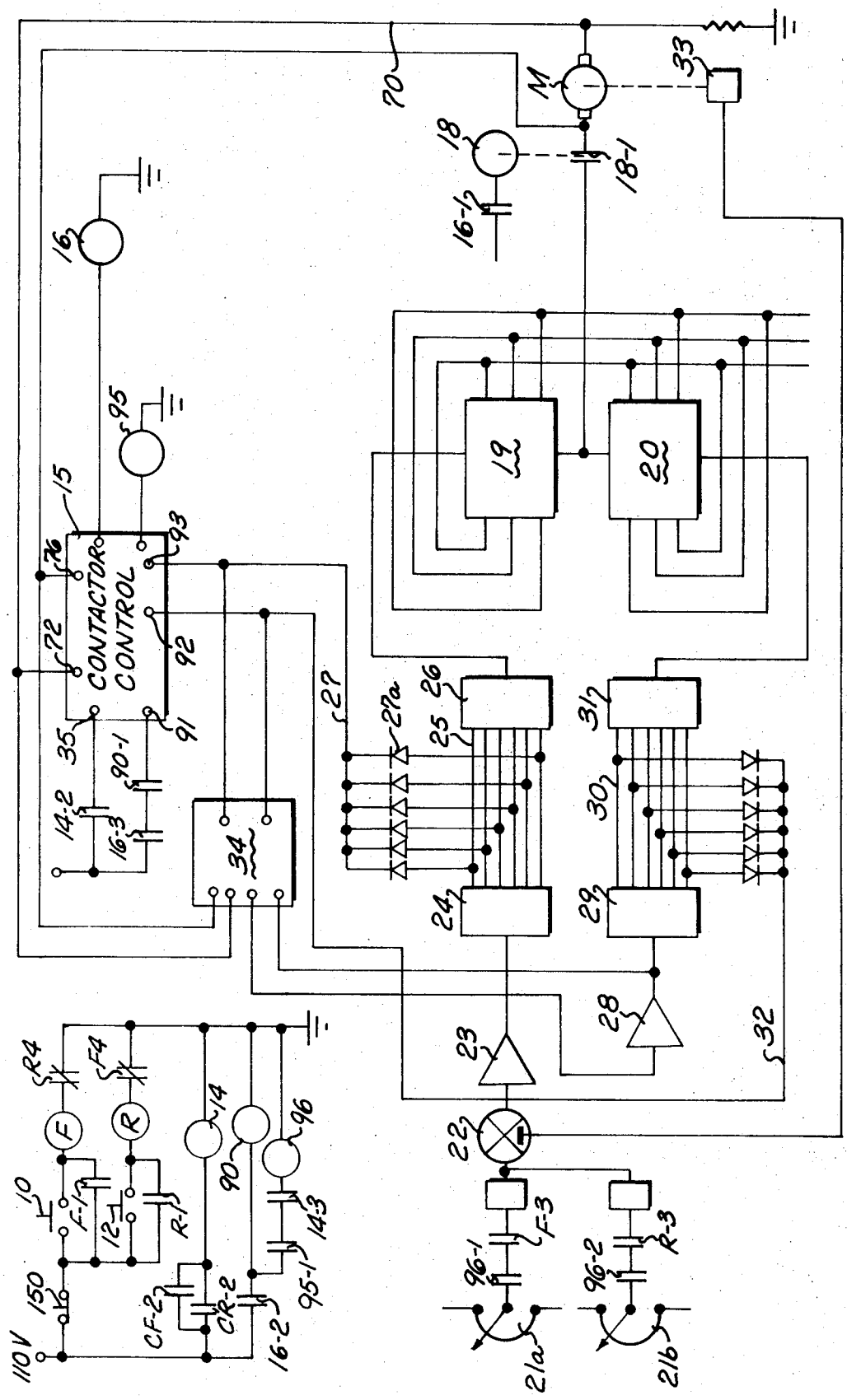

United States Patent [19]
Grygera

[11] 3,728,604
[45] Apr. 17, 1973

[54] MOTOR CONTROL SYSTEM

[75] Inventor: James W. Grygera, Racine, Wis.

[73] Assignee: Eaton Corporation, Cleveland, Ohio

[22] Filed: July 26, 1971

[21] Appl. No.: 165,469

[52] U.S. Cl. ................318/459, 318/327, 318/463, 318/474
[51] Int. Cl. ..............................................H02p 5/04
[58] Field of Search.....................318/327, 317, 274, 318/450, 459, 463, 464, 476, 474

[56] References Cited

UNITED STATES PATENTS

| | | | |
|---|---|---|---|
| 3,475,671 | 10/1969 | Wilkerson | 318/327 X |
| 3,508,132 | 4/1970 | Peterson | 318/327 X |
| 3,555,386 | 1/1971 | Wisman | 318/317 |
| 3,581,172 | 5/1971 | Tsuboi | 318/274 |

*Primary Examiner*—Benjamin Dobeck
*Attorney*—Yount & Tarolli

[57] ABSTRACT

Motor control system in which the electromotive force generated by the motor and motor armature current is sensed on starting and stopping to inhibit operation of the motor contactor for making and breaking the armature circuit in the presence of the electromotive force or armature current.

18 Claims, 3 Drawing Figures

MOTOR CONTROL SYSTEM

The present invention relates to a motor control system in which a condition or conditions of the motor are sensed to inhibit the operation of the means for effecting the energization and de-energization of the motor in the presence of the condition or conditions.

The present circuit is particularly useful in the type of motor control systems in which regenerating circuit means becomes active when the motor is operating in a regenerating mode rather than in a motoring mode of operation. Such a system is disclosed in the co-pending application Ser. No. 165,983, filed by James W. Grygera, concurrently herewith, and assigned to the same assignee as the present invention and entitled Regenerative MOtor Control SYstem. Disclosure of that application is incorporated herein by reference as if fully set forward in this application.

An object of the present invention is to provide a new and improved motor control circuit in which an electrical condition or conditions of the motor is sensed to inhibit actuation of the circuitry for energizing and de-energizing the motor when the condition is present.

A further object of the present invention is to provide a new and improved motor control circuit in which circuitry closing and opening the motor armature circuit for energizing and de-energizing the motor is inhibited from actuation on starting if the motor is being rotated by an external source and is inhibited on stopping if current is flowing in the armature circuit.

A further object of the present invention is to provide a new and improved motor control circuitry in which the presence of a counter electromotive force in the motor on starting will inhibit the starting and after starting will prevent de-energization of the motor contactor prior to stopping.

A further object of the present invention is to provide new and improved motor control circuitry as in the next preceding object in which the motor cannot be de-energized when the counter electromotive force indicates that the motor is stopped if current is flowing in the motor.

A further object of the present invention is to provide new and improved circuitry for actuating various circuits in a motor control in their proper sequence on starting or stopping including the making or breaking of the armature circuit and the enabling of armature current conducting bridges, and the connection of a speed command signal.

Figure 2A:
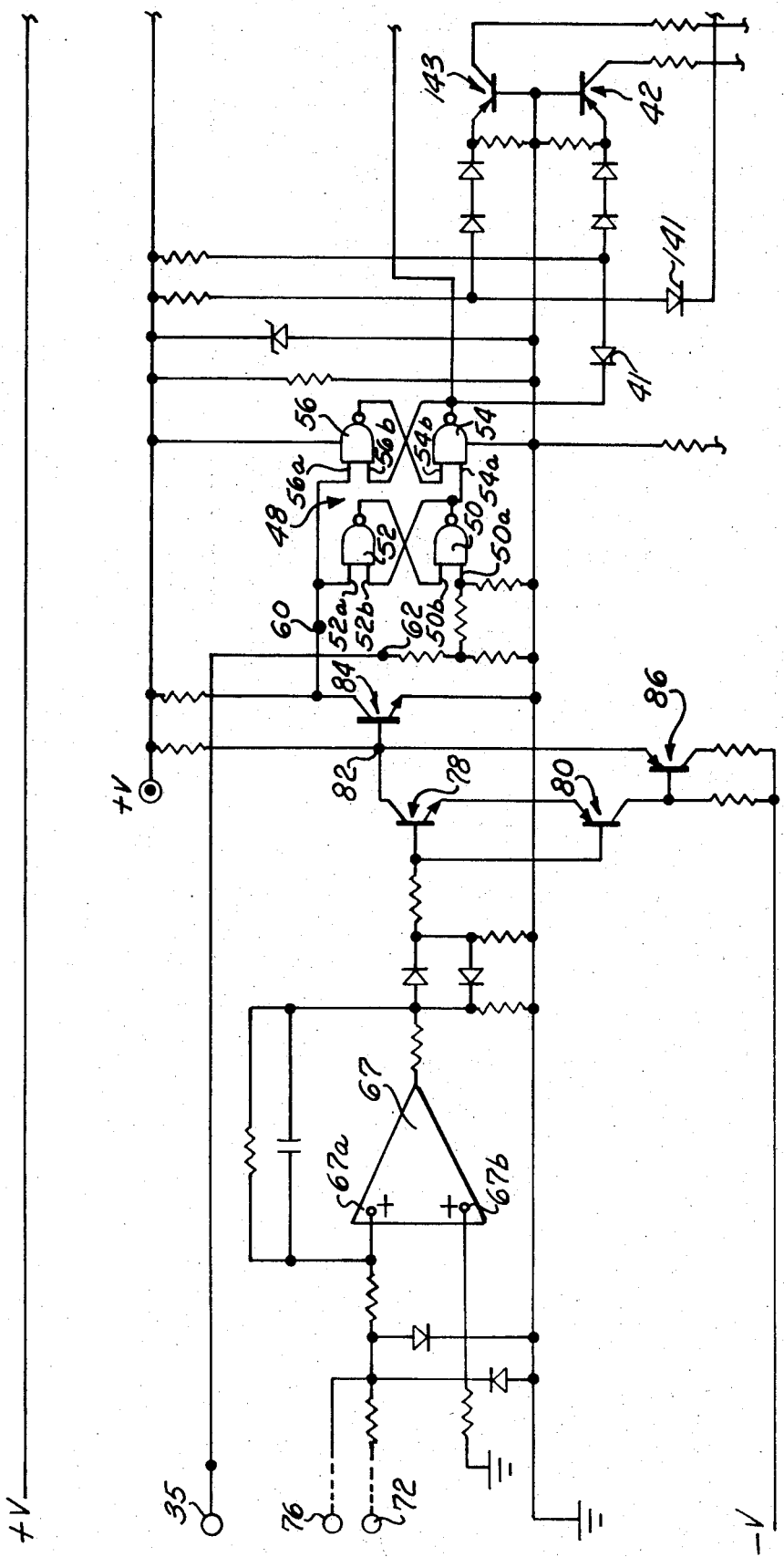
Figure 2B:
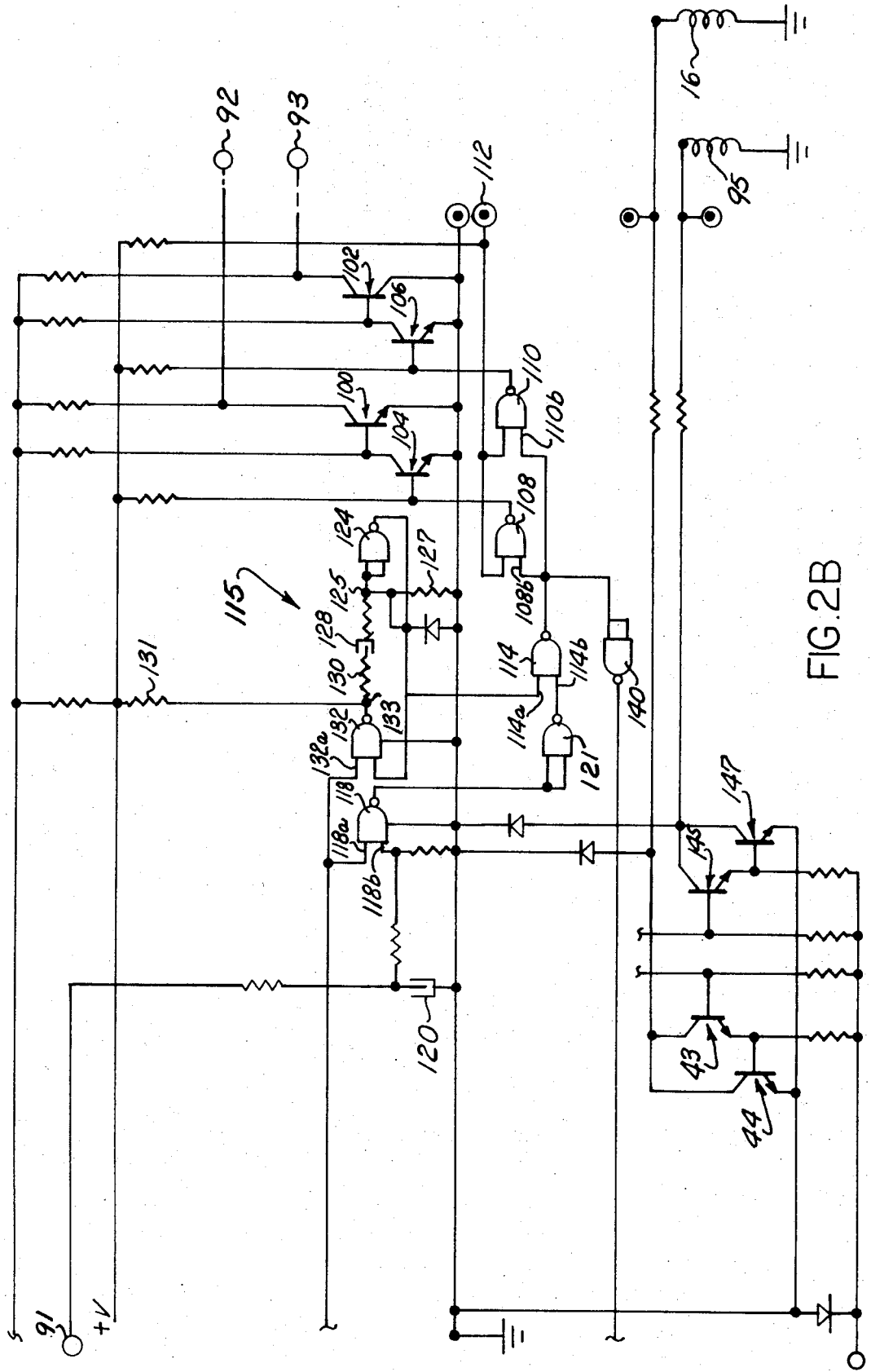

Further objects and advantages will be apparent from the following detailed description thereof made with reference to the accompanying drawing in which:

FIG. 1 is a schematic diagram of a motor control system embodying the present invention; and FIGS. 2A and 2B are a more detailed circuit diagram of a part of FIG. 1.

In the preferred and illustrated embodiment, a start pushbutton 10 is depressed to energize a forward relay coil F if a motor M is to operate in a forward direction or a reverse pushbutton 12 is depressed if the motor is to operate in the reverse direction to energize a reverse relay coil R. Energization of either the coil F or the coil R will close its respective self-holding contact F-1 or R-1 and will also close its respective contact F-2 or R-2 to energize a relay 14, as well as opening respective normally closed contacts F4 or R4 to prevent simultaneous operation of both relays. The energization of the relay 14 will close its contact 14-2 to supply a start signal to a contactor circuit 15 for energizing a control relay 16 having contacts 16-1 in a circuit for energizing a motor contactor 18. The motor contactor has contacts 18-1 in the armature circuit for the motor M.

Current is supplied to the motor M through the contact 18-1 from either a forward rectifying bridge 19 or a reverse rectifying bridge 20, the bridges being conventional full-wave rectifying SCR bridges which have SCRs which are gated on at variable phase angle to control the amount of current supplied to the motor M.

When the motor is operating in the forward direction, the speed of the motor is controlled by a speed reference potentiometer 21a which provides a speed reference signal of positive polarity to an adder 22 whose output is applied to a speed control amplifier 23. The output of the speed control amplifier 23 is applied to a phase shifting network 24 for producing pulses for gating on the SCRs in the forward rectifying bridge 19. The phase of the pulses produced by the phase shifting network 24 with respect to the power wave in the forward rectifying bridge 19 is determined by the magnitude of the error signal from the amplifier 23 in a manner well known to those skilled in that art.

The pulses from the phase shifting network 24 are applied to the SCRs in the bridge 19 over six lines 25 connected to respective gate drivers in gate driving circuitry 26. The pulses to the gate drivers from the forward rectifying bridge 26 may be inhibited by applying a low signal to a line 27 to which each of the lines 25 is connected through a respective diode 27a. If the diodes 27a are back biased by a high level on line 27, the rectifying bridge is enabled to supply forward current to the motor in response to the pulses.

Similarly, the reverse rectifying bridge 20 is controlled in response to a reverse potentiometer 21b which supplies a speed reference signal to the adder 22 of negative polarity. The output of the amplifier 23 is inverted by an amplifier 28 and applied to a phase shifting network 29 for supplying pulses over six lines 30 to gate driving circuitry 31 with the pulses being inhibited by a low potential on a line 32. AS will be well understood by those skilled in the art, when operating in either a forward or reverse direction, the motor M preferably drives a feedback tachometer 33 whose output is applied to a subtractive input of the adder 22 to provide an error signal for the amplifier 23 which is the difference between the command speed reference signal and the speed of the motor. It is further understood by those skilled in the art that when operating in one direction, the bridge for operating in the other direction may be operated as a regenerative bridge to return power to the power line and provide fine control of the motor. Control of the operation of the bridges in such a system is described in the co-pending aforesaid application and is the function of circuit 34 shown in block form in FIG. 1. Circuit 34 will apply high or low potentials to the lines 27, 32 to inhibit or enable the bridges 19 and 20 depending upon whether the motor is operating in a motoring mode or a regenerative mode. As described in my said co-pending application, the circuit 34 compares the counter electromotive force of the motor M with the error signal from the amplifier 23 to determine whether the motor is operating in a motoring condition or a regenerative condition and to accordingly enable or disenable the rectifying bridges 19 and 20.

Referring to FIG. 2A, when the relay 14 is energized on starting to supply a start or operate signal to the circuit 15, the closing of its contacts 14-2 applies a logic 1, i.e., high level, to terminal 35 of the circuit to effect energization, if conditions are otherwise proper, of the relay 16 for energizing contactor 18. The relay 16 is energized by reverse biasing a diode 41. When the diode 41 is back biased, emitter potential is applied to a transistor 42 which, in turn, renders transistors 43, 44 conductive to energize the relay 16. If the diode 41 is not back biased, the emitter potential will be removed from the transistor 42 and the relay 16 is de-energized.

The biasing potential applied to the diode 41 is controlled, in the illustrated embodiment, by an integrated circuit 48 which is known as a quad-2 input gate NAND/NOR circuit. This circuit comprises a pair of NAND gates 50, 52 each having an input 50a, 52a, respectively, for receiving an external signal and inputs 50b, 52b connected to the outputs of the other gate. The circuit also comprises NAND gates 54, 56 cross-connected in a manner similar to the gates 50, 52 with the output of the gate 54 constituting the output of the circuit 48, which circuit 48 is effectively a flip-flop circuit. The inputs to the flip-flop circuit are connected to a terminal 60 which is connected to the inputs 52a, 56a of the NAND gates 52, 56 and a terminal 62 which is connected to the input 50a of the NAND gate 50.

The terminal 62 is connected to the terminal 35 to which the start signal is applied. Initially, low potentials are on the input terminals 60, 62 thereby establishing logic 1's at the outputs of the NAND gates 50, 52 which provides a logic 1 input to the input 54a of the NAND gate 54. The input 56a of the NAND gate 56 has a logic 0 thereon since it is connected to the input terminal 60 and this provides a logic 1 at the output of the NAND gate 56 which, in turn, supplies a logic 1 to the input 54b of the NAND gate 54 to, in turn, in combination with the logic 1 on input 54a provide a logic 0 or low-level output at the output of logic gate 54 to forward bias the diode 41 and render the relay A unenergized.

It can be seen that if the logic 0 input to NAND gate 50 is changed to a logic 1, its inputs will now have two logic 1's thereon to change the output of the NAND gate to a logic 0 which will be applied to the input 54a of the NAND gate 54 to change the output of NAND gate 54 to a high level to energize the relay 16. This will occur provided that a logic 1 has not previously been applied to the terminal 60. If a logic 1 is on the terminal 60, the output of the NAND gate 52 will change to a logic 0 since the NAND gate 52 will now have two 1s on its input and the NAND gate 50 will then be applied with a logic 1 output because it will have logic 0's applied to both inputs and the changing of the input on terminal 62 to a logic 1 will not affect the output of the gate 50.

The application of a logic 1 on the terminal 60 before a logic 1 appears on the terminal 62 will not, however, change the state of the NAND gate 56 since the NAND gate 56 has a logic 0 input on its input terminal 56b from the output of the NAND gate 54. Accordingly, if a logic 1 is applied to the terminal 60, with a logic 0 on the input terminal 62, the output from the NAND gate 54 does not change but the logic 1 does clamp the circuit with a 0 output since if a logic 1 is now applied to the input 62, the output of NAND gate 50 and, in turn, the output of NAND gate 54 will not change. Consequently, to change the output of the NAND gate 54 when the circuit 48 is in a condition where 0's are being applied to inputs 60, 62, a logic 1 must first be applied to the terminal 62. If a logic 1 is first applied to the terminal 62 to effect a back biasing of the diode 41 and energization of the relay 16, the subsequent application of a logic 1 to the input terminal 60 will not affect the circuit since the output of NAND gate 50 will now have a logic 0 therein which is applied to the input of the NAND gate 52 and the change of input 52a to a logic 1 has no effect. While the condition of NAND gate 56 will change when a logic 1 is applied to the input terminal 60 since the input 56b now has a logic 1 applied thereto from the output of NAND gate 54, the output will change from a logic 1 to a logic 0 and the NAND gate 54 will now have two logic 0's on its inputs so that its output does not change with the change of state of the NAND gate 56.

After a logic 1 has been applied to the input terminal 60, the change on input terminal 62 from a logic 1 to a logic 0 will not change the output of NAND gate 54 since its input 54b has a logic 0 applied thereto from the NAND gate 56. Consequently, after the circuit has been activated by first applying a logic 1 to the terminal 62, it cannot be activated to produce a logic 0 at the output of gate 54 by a loss of the logic 1 input at terminal 62 if a logic 1 has subsequently been applied to the terminal 60. If the terminal 60 is at a logic 0 and the terminal 62 loses its logic 1, the output of the NAND gate 54 will change and the circuit will switch to its normal quiescent condition when the motor is stopped.

In the illustrated embodiment, the terminal 62 has a logic 1 applied thereto when the pushbutton 10 is pressed to energize relay 14 to start the motor. When the relay 14 is energized it supplies an operate signal to the terminal 35 of circuit 15 and input terminal 62 and the output of NAND gate 50 will change to a logic 0 to change the output of the NAND gate 54 to a logic 1 to back-bias the diode 41 and energize the relay 16 if conditions are proper. When the relay 16 is energized, it closes its contacts 16-1 to energize the motor contactor 18 to close the armature circuit (FIG. 1). As will be explained hereinafter, the circuit 15 also effects the application of the speed motor signal to the motor circuit to cause current to flow in the motor. The flow of current in the motor is sensed as well as the speed of the motor to provide a logic 1 signal to the input terminal 60.

As shown in FIG. 2, the starting circuit 15 includes an operational amplifier 67 having an inverting terminal 67a and a non-inverting terminal 67b. A reference (ground) is applied to non-inverting terminal 67b and a motor current signal is derived over a connection 70 and is applied to a terminal 72 shown on the circuit of FIG. 2 and the counter electromotive force of the motor is applied over a connection to a terminal 76 of FIG. 2. The terminals 72, 76 are connected by resistors to the inverting terminal 67a of the amplifier 67 so that if the motor is rotating, a voltage signal is applied to the terminal 76 and if current is flowing in the armature circuit, a signal is applied to the input terminal 72. Either one of these signals will cause the output of the amplifier 67 to change from what is normally a 0 or low-level output to a higher level output. However, the signal representing the counter electromotive force of the motor normally controls the output of the amplifier since no current is normally flowing when the motor is stopped. The current signal is present primarily to permit operation in a stalled mode and will assure that the contactor is not opened in this mode of operation.

The change from 0 level output to a different level output from the amplifier 67 will render either a transistor 78 or a transistor 80 conductive depending on the direction of change. When the amplifier 67 has no input signal at terminals 72, 76, the reference voltage applied to the non-inverting input terminal 67b provides a voltage at the output amplifier such that transistor 78 is non-conductive as well as transistor 80. If the signal becomes positive in response to an input at terminals 72, 76, the transistor 78 conducts to lower the potential of a junction 82 raised to cut off a transistor 84 and apply a high level, i.e., a logic 1, to terminal 60. In the absence of an input to the amplifier 67, the transistor is conductive and its collector is at a low level applying a logic 0 to terminal 60. If the output of amplifier 67 swings negative, the transistor 80 will be rendered conductive to, in turn, render a transistor 86 conductive. The transistor 86 has its collector connected to the junction 82 and when it is conductive, the potential of the junction is lowered by reason of the fact that the emitter of transistor 86 is connected to a more negative potential than is the emitter of transistor 84. This cuts off transistor 84 to apply a logic 1 to the terminal 60.

Consequently, it can be seen that either current flowing in the armature or a counter electromotive force from the motor will cause logic 1 to be applied to the reset terminal 60 and from the above description of the operation of circuit 48, it will be clear that if this logic 1 is applied to terminal 60 before the logic 1 is applied on terminal 62 from depressing the start button, the control relay 16 will not be energized. Accordingly, the motor will not start in response to the pushbutton if the motor is being driven by an external load. Such rotation of the motor will provide a counter electromotive force signal due to the residual magnetism of the field to the terminal 76 of the amplifier 67 to apply a logic 1 input to the terminal 60. Also, if the motor is operating and if the motor is to be stopped, the removal of the logic 1 from the input terminal 62 will not de-energize the control relay 16 until the motor regenerates or is driven to a stop condition so that there is no counter electromotive force and the armature current in the motor ceases.

The current signal is normally overridden by the counter electromotive force signal and functions primarily to prevent de-energization of the motor contactor when the motor is operating as a torque motor in a stalled condition.

Circuit 15 also includes circuitry for affecting the application of a holding signal to the circuit 15 and enabling signals and the speed command signal to the speed control circuitry. Referring to FIG. 1, when the relay 16 is energized it closes its contacts 16-2 to energize a relay 90. The relay 90 has contacts 90-1 in series with contacts 16-3 of relay 16 which are now closed to supply a holding signal to terminal 91 of control circuit 15. When the holding signal is applied to terminal 91 with circuitry 48 having a logic 1 on its output, high level enabling signals appear on forward and reverse enabling terminals 92, 93 respectively and a relay coil 95 is energized. When coil 95 is energized it closes its contacts in series with normally open contacts 14-3 of relay 14 which are now closed and contacts 16-2 of relay 16 to energize a relay 96. The relay 96 has normally open contacts 96-1, 96-2 in series with the potentiometers 21a, 21b, respectively and the adder 22. The forward and reverse relays have contacts F-3, R-3 respectively in series with the contacts 96-1, 96-2 respectively to select the proper speed command signal. Consequently when the relay 96 is energized a speed command signal is applied to the adder 22.

When holding signal is applied to terminal 91 and the output of the circuit 48 is a logic 1, enabling signals for the bridges are provided on the terminals 92, 93 by rendering transistors 100, 102 (FIG. 2B) non-conductive. The transistors 100, 102 are rendered non-conductive when transistors 104, 106 respectively are rendered conductive. The transistors 104, 106 have their collectors connected to bases of the transistors 100, 102 respectively and when the transistors 104, 106 are cut off the transistors 100, 102 are respectively conductive to provide low level signals at the terminals 92, 93. The conduction of the transistors 104, 106 is controlled by respective NAND gates 108, 110 and when the NAND gates have a logic 1 on their outputs, the transistors 104, 106 will conduct cut off transistors 100, 102 to provide high level signals at the output terminals 92, 93 and when they have a logic 0 on their outputs, the transistors 104, 106 are non-conductive and the transistors 100, 102 are conductive to provide low level signals at the terminals 92, 93. The NAND gates 108, 110 have a logic 1 applied to one of their inputs from a power connection 112. Since the NAND gates 108, 110 have a logic 1 on one of their inputs when the line 112 has power thereon, their second inputs 108b, 110b control the state of the gates. The inputs 108b, 110b are connected to the output or NAND gate 114 having an input 114a which normally has a logic 1 thereon from a circuit 115.

When the switching circuitry 48 has a logic 1 on its output, the enabling signals for the forward and reverse rectifying bridges are to be provided immediately after the closing or energization of the relay 16. As explained above, energization of the relay 16 applies a holding signal to terminal 91. The application of this signal to terminal 91 will apply a logic 1 to an input 118b of a NAND gate 118 with a delay caused by a condenser 120. The gate 118 has a second input 118a connected to the output of the switching circuitry 48 which now has a logic 1 thereon so that the output of NAND gate 118 switches from a logic 1 output to a logic 0 output. The output of the gate 118 is inverted by a NAND gate 121 whose output is connected to the input 114b of the NAND gate 114 whose output controls the outputs of the NAND gates 108, 110.

The NAND gate 114 normally has a logic 1 applied to its second input 114a from the circuitry 115. The circuitry 115 comprises a NAND gate 124 whose inputs are connected to a junction 125 which is connected to ground by a resistor 127 and to the positive side of the power supply through a condenser 128 and resistors 130, 131. The circuit 115 also includes a NAND gate 132 having its output connected to a junction 133 to the positive side of the resistor 130 and its input 132a connected to the output of the circuit 48 and its second input connected to the output of NAND gate 124. The output of NAND gate 124 is normally a logic 1 since the junction 125 normally is at ground. This applies a logic 1 to the NAND gate 132 of the circuitry 115 as well as to the NAND gate 114.

When the switching circuit 48 has a logic 0 output, the output of the NAND gate 132 is a logic 1. When the circuit 48 switches from a logic 0 output to a logic 1 output to apply two logic 1's to the input of NAND gate 132, its output will change to a logic 0 which will lower the potential at junction 133 which in turn will lower the potential at junction 125 until the condenser 128 discharges. This does not affect the logic 0 input to NAND gate 124. The resistor 127 has a diode 125 connected thereacross to allow the condenser discharge current to by-pass resistor 127. It can now be seen that the output of circuit 115 to NAND gate 114 is unaffected on starting and that NAND gate 114 will be switched to a 0 output in response to the switching of the NAND gate 118 to provide a logic 0 output therefrom. Therefore, when the NAND gate 114 is activated in response to the application of the holding voltage on terminal 91 as above described, it changes its output from a logic 1 to a logic 0 which, as described above, applies the high level gating signals to the terminals 92, 93.

The output of the NAND gate 114 is also applied to the inputs of an inverting NAND gate 140 whose output is utilized when it is a logic 1 to back-bias a diode 141 to establish an emitter potential on transistor 143 to render the transistor conductive. The collector of the transistor 143 is connected to the negative side of the power supply, that is below ground, and when the transistor is conductive, the emitter-Collector current will establish a voltage to effect the turning on of transistors 145, 147 for energizing coil 95.

From the foregoing, it can be seen that after the armature contacts has been closed, the forward and regenerative rectifier bridges will be rendered effective by the voltages applied to the terminals 92, 93 and the reference signal will be applied by the energization of the coil 95 to in turn effect the energization of coil 96 and the application of the selected speed command signal.

When the motor is to be stopped, stop push button 150 in series with the forward push button 10 and the reverse push button 12 and the holding circuits thereacross is depressed to de-energize the energized one of the forward coil F and the reverse coil R. When this occurs, the contacts of the coil F or R which were maintaining relay coil 14 energized will be opened to de-energize this coil and to open its contact 14-3 in the circuit for energizing coil 96 to immediately open contacts 96-1 and 96-2 in series with the potentiometers 21a, 21b. This immediately removes the speed command signal from the amplifier 23 and causes the motor to coast or operate in a regenerative mode to a stop condition. When the motor reaches a stop condition, the loss of the counter electromotive force signal to the amplifier 67 will cause it to have an output which cuts off the conductive one of transistors 80 and 82 to apply a logic 0 to the input terminal 60 of the flip-flop circuit 48. AS soon as this input becomes 0, the flip-flop 48 will change its condition to de-energize the contactor control relay 16 to in turn open the motor circuit for the motor M and will also cause the enabling signals at terminals 92, 93 to switch to inhibit signals and effect the de-energization of relay coil 95. When the circuit 48 switches its output to a logic 0, the NAND gate 132 of circuit 115 changes its output from a logic 0 to a logic 1 which will raise the potential of junction 133 to cause a logic 1 to be applied to the junction 125 so that the output of NAND gate 124 becomes a logic 0. This logic 0 causes the output of NAND gate 114 to immediately become a logic 1 to cause a loss of the enabling levels at terminals 92, 93 and to cause the de-energization of relay coil 95. It will be recognized that the logic 1 on the inputs to NAND gate 124 will become logic 0 as soon as the condenser 128 charges. This will reset the circuit 115 to respond to the next actuation of the flip-flop 48.

It will be appreciated from the foregoing description that there will not be a loss of logic 1 to the terminal 60 until the armature current stops flowing. Normally, the armature current will not be flowing when the motor is stopped unless the motor is operating in a stalled condition. By providing the current input to the amplifier 67, The current input will maintain a logic 1 to the terminal 60 in this condition and prevent the motor contactor 18 from being de-energized when there is armature current in the stalled condition of the motor. As noted hereinbefore, the counter electromotive force signal normally is greater and overrides this signal. From the foregoing description it can be seen that the circuit operates in the same manner in the forward or reverse operation and for forward and reverse current since the output of the amplifier 67 will turn on the transistor 78 as it swings positive or transistors 80, 86 if its swings negative to, in either case, maintain a logic 1 on the input terminal 60.

From the foregoing it can also be seen that the phase shifting networks, the gate drivers, and the bridges constitute power converters for supplying rectified A.C. to the motor M in response to the speed command signal from the potentiometer 21a, 21b and that the contacter control circuit effects the enabling and disenabling of the circuit in the proper sequence on starting and stopping.

What is claimed is:

1. In a motor control system for a motor including a circuit for conducting motor current to effect electrical driving of the motor, a contactor having contacts in said circuit for making and breaking the circuit to the motor on the starting and stopping of the motor, control means actuatable to initiate and stop the electrical operation of the motor, first means actuated to first and second states in response to said control means to respectively make and break said circuit on the starting and stopping of motor operation, second means for sensing a condition of said motor, and third means responsive to said second means for inhibiting actuation of said first means from one of said states to the other until the cessation of said condition.

2. In a motor control system as defined in claim 1 wherein said third means comprises means inhibiting the actuation of said first means from its second state to its first state in the presence of said condition.

3. In a motor control circuit as defined in claim 1 wherein said second means comprises means for sensing a condition dependent on rotation of said motor and preventing the actuation of said first means to a state to start said motor while said motor is rotating.

4. In a motor control circuit as defined in claim 3 wherein said condition is the electromotive force generated by said motor when rotated by an external force.

5. In a motor control system according to claim 3 wherein said third means comprises means inhibiting the actuation of said first means from its state for stopping said motor in the presence of said condition.

6. An electrical control system as defined in claim 1 wherein said third means comprises first circuitry for inhibiting the actuation of said first means from said first state to said second state and said second means comprises means responsive to current flowing in said motor.

7. A control circuit as defined in claim 2 in which said third means has a first state for inhibiting said first means from changing states and comprises first and second input terminals for respectively receiving an operate signal and a condition signal indicative of said condition, said first means comprising logic means having a first state in the absence of an operate signal and a signal indicative of said condition and being actuated to said second state in response to the presence of said operate signal and the absence of a condition signal and being returnable to said first state in the absence of an operate signal and the absence of said condition signal.

8. An electrical control system as defined in claim 3 wherein said second means comprises means responsive to current flowing in said motor.

9. In a motor control circuit as defined in claim 7 wherein said second means comprises means for sensing a condition dependent on rotation of said motor and preventing the actuation of said first means to a state to start said motor while said motor is rotating.

10. A control circuit as defined in claim 9 wherein said second means includes means for sensing armature current.

11. In a motor control system as defined in claim 1 including means for providing a speed command signal for said motor, speed control means responsive to said signal for controlling the conduction of current to said motor in response to said command signal, and control circuitry means responsive to the actuation of said first means to its state for energizing said motor to effect connection of said speed command signal to said speed responsive means.

12. In a motor control system as defined in claim 11 wherein said condition comprises the counter-electromotive force of said motor and said third means inhibits operation of said first means to effect operation of said contactor to make said circuit.

13. In a motor control system, control means for starting and stopping a motor comprising first means actuatable between first and second states to energize and de-energize the motor, second means for sensing a condition of said motor, third means responsive to said second means for inhibiting said first means from being actuated from one state to another state until the cessation of said condition, means for providing a speed command signal for said motor, speed control means responsive to said signal for controlling the conduction of current to said motor in response to said command signal, control circuitry means responsive to the actuation of said first means to its state for energizing said motor to effect connection of said speed command signal to said speed responsive means, said control means comprising means settable to apply an operate signal to said first means for effecting actuation thereof to its state for energizing said motor and stop means actuatable to interrupt said operate signal to stop said motor and including speed signal control means actuated on the actuation of said stop means to immediately disconnect said speed command signal, and said third means comprising means responsive to said condition to inhibit actuation of said first means to its state for de-energizing said motor in the presence of said condition.

14. In a motor control system as defined in claim 13 wherein said condition comprises armature current flowing in said motor.

15. In a motor control system as defined in claim 13 wherein said system comprises a power converter for supplying rectified alternating current power to said motor in response to said speed command signal and a second power converter for transmitting power from said motor when the motor is operating in a regenerative mode, said first and second power converters including inhibit terminals for receiving an inhibit signal which inhibits operation of the power converters, said control means comprising means responsive to the actuation of said first means for energizing and de-energizing said motor to remove and apply inhibit signals to said terminals.

16. In a motor control system, control means for starting and stopping a motor comprising first means actuatable between first and second states to energize and de-energize the motor, second means for sensing a condition of said motor, third means responsive to said second means for inhibiting said first means from being actuated from one state to another state until the cessation of said condition, means for providing a speed command signal for said motor, speed control means responsive to said signal for controlling the conduction of current to said motor in response to said command signal, control circuitry means responsive to the actuation of said first means to its state for energizing said motor to effect connection of said speed command signal to said speed responsive means, a power converter for supplying rectified alternating current power to said motor in response to said speed command signal and a second power converter for transmitting power from said motor when the motor is operating in a regenerative mode, said first and second power converters including inhibit terminals for receiving an inhibit signal which inhibits operation of the power converters, said control means comprising means responsive to the actuation of said first means for energizing and de-energizing said motor to remove and apply inhibit signals to said terminals.

17. A motor control system as described in claim 11 wherein said system includes a power converter comprising a controllable rectifying bridge for conducting unidirectional current to drive said motor in accordance with said speed command signal, said power converter including an inhibit terminal for receiving an inhibit signal for inhibiting operation of the converter and said control means comprises means responsive to the actuation of said first means for effecting the operation of said contactor to remove and apply said inhibit signal.

18. In a motor control system for a motor including a circuit for conducting motor current to effect the electrical operation of said motor, a contactor having contacts in said circuit for making and breaking the circuit to the motor on the starting and stopping of the motor, a control means actuatable to initiate and stop the electrical operation of the motor, first means actuated to first and second states in response to said control means to actuate said contactor to respectively make and break said circuit on the starting and stopping of the motor, sensing means for sensing the armature current of said motor and for sensing the counter-electromotive force of said motor, and third means responsive to said second means for inhibiting actuation of said first means to start operation of said motor in the presence of a counter-electromotive force and to inhibit operation of said first means to stop said motor in response to the presence of armature current.

* * * * *